Aug. 17, 1926.
F. H. JONES
1,596,839
FRICTION CLUTCH
Filed Dec. 30, 1922    5 Sheets-Sheet 1
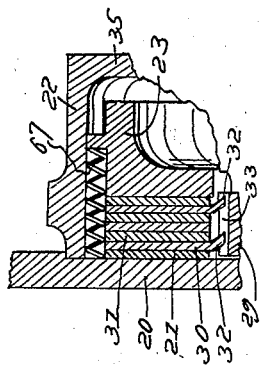
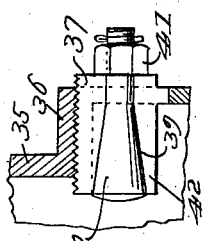
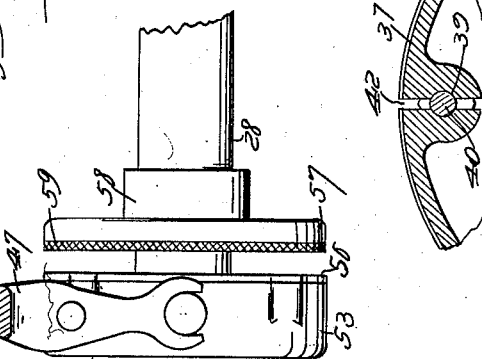
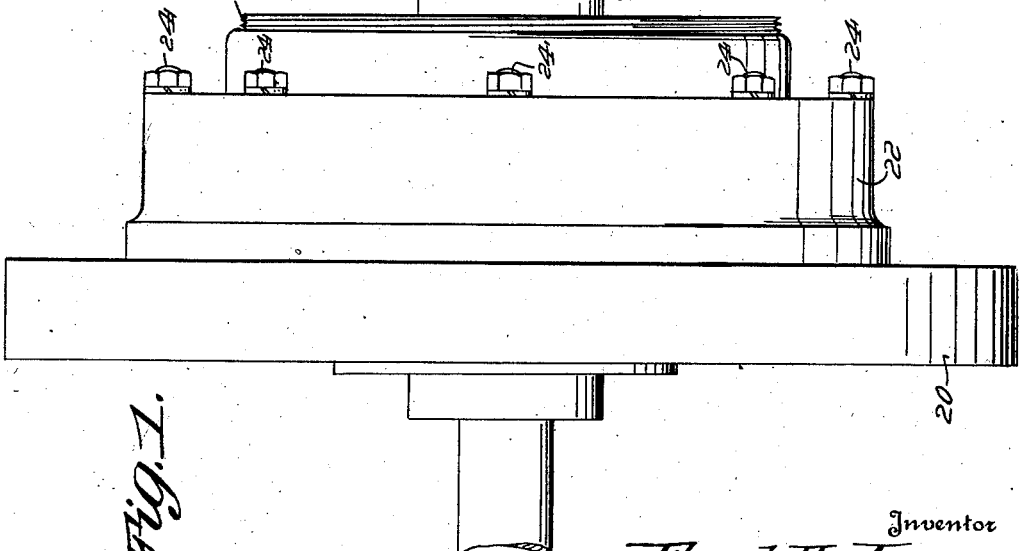
Inventor
Frank H. Jones,
By Etienne Talbert
Attorney

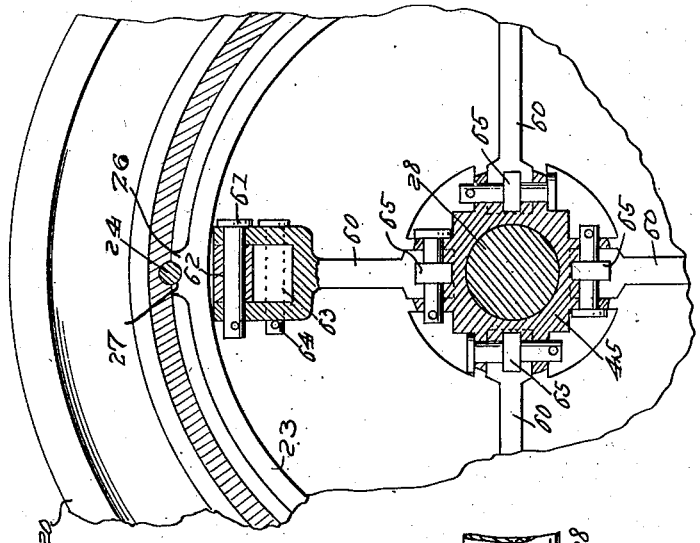

Aug. 17, 1926.

F. H. JONES 1,596,839

FRICTION CLUTCH

Filed Dec. 30, 1922    5 Sheets-Sheet 3

Inventor
Frank H. Jones,

By _____
Attorney

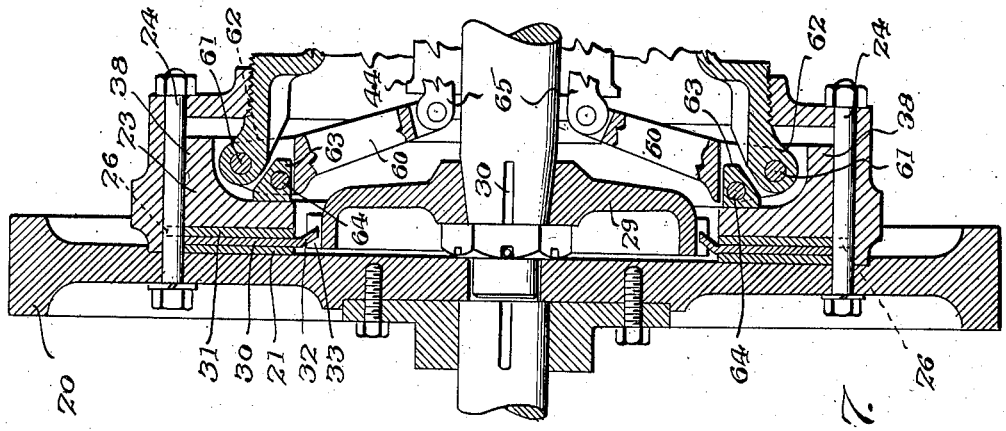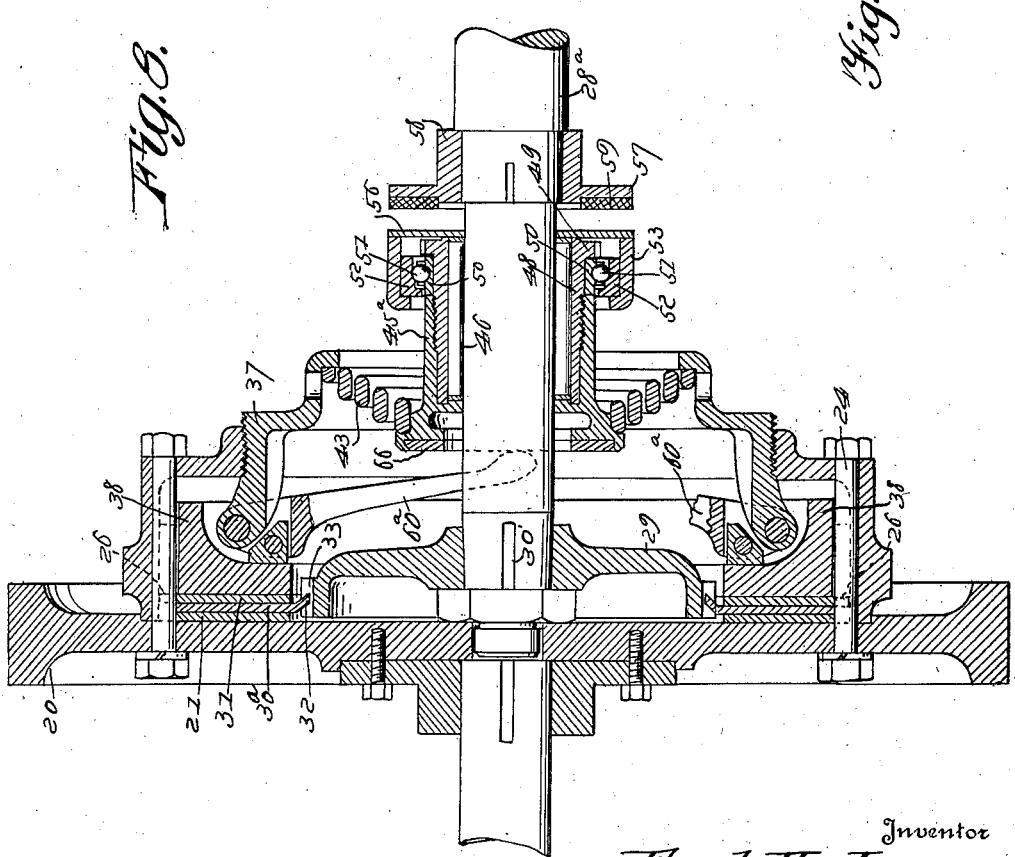

Aug. 17, 1926.
F. H. JONES
1,596,839
FRICTION CLUTCH
Filed Dec. 30, 1922
5 Sheets-Sheet 5
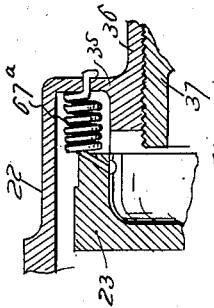
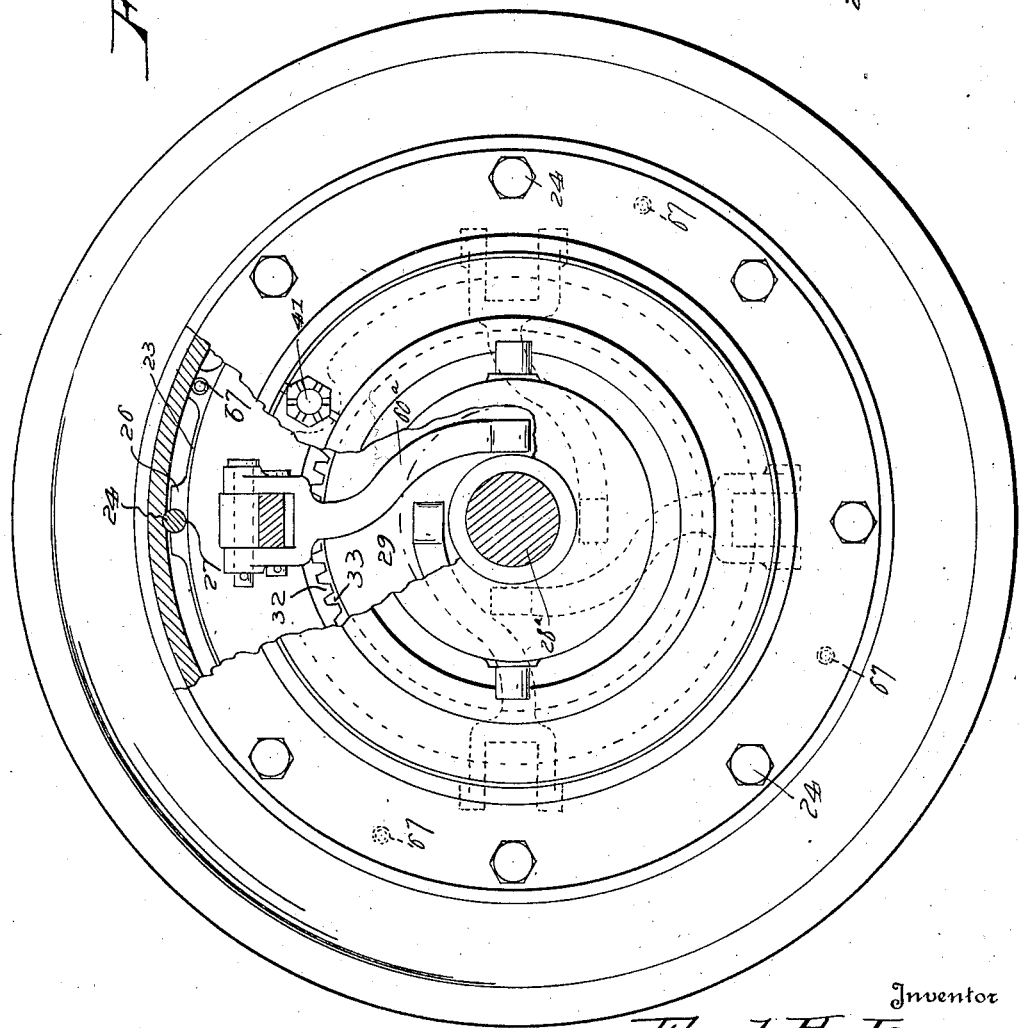
Inventor
Frank H. Jones,
By
Attorney Patented Aug. 17, 1926.

1,596,839

UNITED STATES PATENT OFFICE.

FRANK H. JONES, OF CLEVELAND, OHIO.

FRICTION CLUTCH.

Application filed December 30, 1922. Serial No. 609,852.

The invention has relation particularly to clutches of the type used in connection with motor-driven vehicles and has for its object to provide a friction clutch wherein the elements may be brought into and moved out of engagement in the closing and opening of the clutch without chatter or the jerking of the driven shaft incident to binding and slipping of the frictional elements and similar causes.

Further an important object of the present invention is to provide a clutch wherein the driving and driven members are provided with frictional bearing faces of the largest available diameter under the present standard dimensions of flange used on multiple disk clutches so that it may not be necessary in applying the clutch or in adapting it to various vehicles to make any changes in the present or standard fly wheel dimensions or the provisions in connection with such fly wheels for the attachment of the clutch, to the end that complications in assembly and increase in cost to the builder of the vehicle desiring to use the clutch may be avoided.

Furthermore it is the object to provide a clutch having all of the driving and driven contact points hardened to minimize wear and prevent back-lash so as to avoid rattle and chatter in the engagement of the frictional members; to provide means where the bolts or studs used to secure the driving drum to the fly wheel may be utilized as additional means for keying the elements of the driving member to insure an accurate and forceful cooperative action thereof with relation to the elements of the driven member, and in that connection to provide means whereby the replacement of the securing bolts or studs and which can be hardened to adapt them to perform their additional function of keys in connection with the movable elements of the clutch, may be removed and replaced with facility when they become worn, without involving any change in reference to the motor fly wheel or the standards of measurement thereof and without necessitating the disassembly of the parts of the clutch; to provide a driving housing or a housing element of the driving member of the clutch wherein the bolts which serve as the means of fastening the driving member to the fly wheel or other equivalent member of the motor may have a keyed and reinforcing relation with the housing in addition to their keyed relation with the movable element of the driving member, to the end that a shearing stress is applied to said bolts as distinguished from a bending strain common in the present practice.

Moreover it is an additional important object of the invention to construct the movable or pressure element of the driving member of the clutch wherein a uniform bearing contact of the faces of the elements of the driving member with those of the driven member throughout the areas of said faces, without the possibility of any twisting, springing or warping of said pressure element incident to the strain applied thereto in the closing of the clutch; and more especially to provide a construction and relation of the elements to permit of a practically unlimited adjustment of the parts within the entire range of utility of the frictional elements or plates, or in other words within a range of movement sufficient to permit of entirely wearing out the frictional elements of the driven member, and therefore of securing an accurate and operative adjustment of the parts under all conditions of use and wear, without disassembling the clutch or detaching it or any of its parts from the motor or fly wheel and under conditions permitting of the locking of the adjustable means against possible displacement without in any way affecting or distorting the movable elements which function in the opening and closing of the clutch.

It is also an object of the invention to provide means whereby angular or rotary adjustment of the frictional elements of the driven member may be effected with relation to the driven shaft and whereby the releasing element of the clutch without in any way interfering with its pedal controlled movement is relieved of any tendency of the driven shaft to cause the spinning or prolonged rotation of the driven member, and to provide means whereby a braking action may be applied to the driven member by a continuation of the clutch releasing or opening movement of the clutch pedal.

With the foregoing and other related objects in view and as will appear in the course of the following detailed description of the invention, the latter consists in the construction and combination of parts of which a preferred embodiment is shown in the accompanying drawings, wherein:—

Figure 1 is a side view, and

Figure 2 is a sectional view taken axially of a clutch mechanism embodying the invention.

Figure 3:
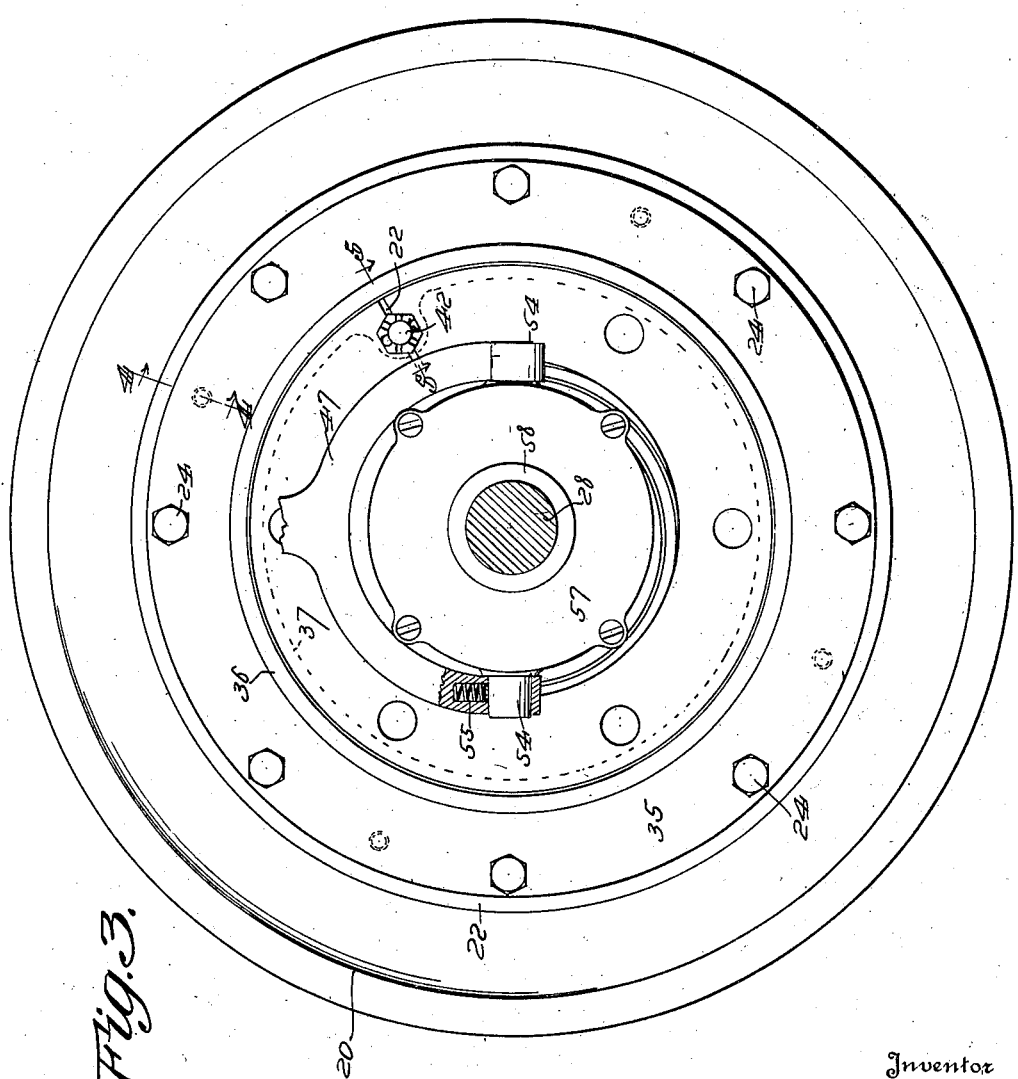
Figure 3 is a rear elevation of the same.

Figures 4 and 5 are detail sectional views on the planes indicated by the lines 4—4 and 5—5 of Figure 3.

Figure 6 is a detail sectional view of the structure shown in Figure 5 and taken in a plane at right angles to the latter.

Figure 7 is a view similar to Figure 2 showing a modified construction of the frictional element of the driven member.

Figure 8 is a view similar to Figures 2 and 7 showing a modified construction of the means for transmitting motion to the pressure element of the driving member.

Figure 9 is a rear elevational view, partly broken away, of the structure shown in Figure 8.

Figure 10 is a detail sectional view of the structure of Figure 2 taken on a plane at right angles to the latter at a point between the elements 35 and 23.

Figure 11 is a detail sectional view of the structure of figure 9 taken on an axial radially disposed plane of the latter to illustrate the retracting springs for effecting the release of the driven clutch member.

As a matter of convenience the clutch is illustrated in connection with and is adapted for application to a conventional fly wheel 20 which should be understood as representing any suitable or preferred part or member of a motor or motor-driven device as the carrier for the driving member of the clutch of which a bearing element consisting of an annular plate 21 is shown in contact with the surface of the fly wheel but the function of which as common in this type of clutch may be performed by the side surface of the fly wheel itself and which therefore in the following description will be referred to as a frictional surface of the driving member without distinction as to whether it is an applied element or plate as shown or the surface of the fly wheel. In addition to this frictional plate or element the driving member of the clutch includes as an element a housing 22 and as another element a pressure ring 23 of which the latter is enclosed within the former and is movable in a direction toward and from the frictional element 21. The housing element is secured to the fly wheel or its equivalent by means of bolts 24 which are adapted to engage the standard bolt holes of a conventional fly wheel construction but are preferably hardened and are embedded at their outer sides in seats 25 formed in the inner surface of the wall of the housing so as to permit their projection into a space bounded by the housing wall a distance sufficient to form keys upon which the pressure element 23 of the driving member is mounted for sliding movement. said pressure element being provided with peripheral lugs 26 having seats 27 for engagement with said keys.

The driving member of the clutch co-operates with a driven member carried in this instance by the driven shaft 28 which extends axially into the housing element of the driving member, said driven member consisting essentially of a disk like or wheel like head 29 keyed or otherwise rigidly secured as at 30 to the driven shaft and of a diameter approximating that of the inner peripheries of the fixed and movable bearing elements 21 and 23 of the driving member. The driven member also includes a frictional element consisting in this instance of an annular disk or plate 30ª which is interposed between the frictional faces of the elements of the driving member for compression therebetween, suitable friction cushions or facings or linings 31 of fibre or the like being interposed between the surfaces of said frictional elements as in the ordinary practice to afford a frictional resistance to sliding movement of one surface on the other. In the construction illustrated in Figure 2 the frictional element 30ª of the driven member is duplicated as shown while in the construction illustrated in Figure 7 a single element is employed in this connection but in both instances there is a keyed or interlocking relation between the frictional element and the head 29 consisting in the provision of the frictional element 30ª at its inner periphery with inwardly directed teeth 32 for engagement with peripheral teeth 33 on the head, the teeth of the latter being of a considerable extent measured parallel with the axis of the clutch so as to permit a freedom of movement of the frictional element 30ª between the planes of the operative faces of the elements of the driving member, and thus provide for a floating of the frictional element of the driven member.

Whereas in the construction shown in Figure 2 a plurality of the frictional driven elements is employed it is preferred to provide the driving member with an auxiliary frictional element 34 consisting of an annular plate similar to the elements 30ª but engaged with the keys formed by the bolts 24 which secure the housing member in place.

The arrangement just described, as will be obvious, provides a frictional zone for the clutch as between the driving and driven members thereof which is of the maximum diameter within the limits of the space bounded by the bolts which serve as the means of attaching the clutch to the conventional type of fly wheel, so that a maximum efficiency of the frictional faces is thereby assured, and in addition thereto it should be noted that the communication of motion from the frictional element of the driven member which is interposed between the opposed faces of the elements of the driving member is communicated to the driven shaft at a point which is remote from the axis of said shaft due to the diameter of the head 29, and therefore that a long leverage in the transmission of motion is thereby secured and while the power is correspondingly increased the tendency to strain or disarrange the elements is minimized.

The housing element of the driving member is inwardly flanged as shown at 35 in the illustrated construction and this flange terminates in an outwardly or rearwardly directed collar 36 in which is threaded an annular member 37 constituting a carrier for the means whereby motion is communicated to the pressure element 23 of the driving member. At its periphery this carrier embodies an exteriorly threaded ring which engages an interior thread of the collar 36 so as to provide by the turning of the carrier for a movement or adjustment of the carrier in parallelism with the axis of the clutch or in the path of the movement of the movable or pressure element 23 of the driving member, so that an adjustment of the carrier is permitted through a range of movement sufficient to take up for any lost motion between the frictional faces of the clutch members any amount of wear in said elements down to the point of complete dis-appearance of the frictional plates or of the frictional pads or cushions interposed between the same. Moreover in order that an accurate movement of the pressure member 23 of the clutch may be assured and the movement of the inner flat surface thereof may be uniformly in parallelism with the plane of the opposing frictional face of the driving member, represented as above indicated by the plate 21, and in order that there may be no springing, warping or twisting of said pressure ring 23 in the operation of the clutch, said ring is preferably provided with a reinforcing flange 38 extending rearwardly from the plane of the body portion of the ring and thus affording a long bearing on the keys formed by the housing bolts 24. Moreover in order that the adjustment of the carrier ring 37 to take up lost motion or wear of the frictional elements of the clutch members may be followed by a locking of said carrier in its adjusted position with an accuracy avoiding any disarrangement of the frictional elements or the accuracy of superficial contact thereof in the operation of the clutch, it is preferred to split the ring 37 or employ a means, providing for a diametrical clamping action of the threaded parts 36 and 37, so that there may be an absence of even a minute displacement axially or otherwise of the parts in securing the carrier in its adjusted position. Between the split ends of the carrier ring (see Figures 5 and 6) there is formed a conical seat 39 engaged by a conical or wedge key 40 which when tightened by means of a nut 41 serves the desired purpose. The split indicated at 42 is not extended entirely through the ring as shown to avoid the possibility of disalignment of the threads, but is extended sufficiently to permit of a diametrical variation of the threaded portion of the ring sufficiently to insure a positive and forcible clamping action which effectively locks the carrier in its adjusted positions.

A clutch closing spring 43 is seated on the carrier 37, thus being adjusted therewith and insuring a uniform tension of the spring regardless of the adjustment of the carrier to take up lost motion or wear and bears against a lip 44 at the inner end of a sleeve 45 which is movable axially or in parallelism with the axis of the clutch and upon the driven shaft, with, however, an interposed roller bearing represented by the rollers 46 of a length insuring an accurate lineal movement of the sleeve and serving as a positive means of preventing the communication of motion from the sleeve to the driven shaft when the pedal lever 47 is actuated to open the clutch. Threaded into the sleeve is a bearing thimble 48 of a length equal to the rollers and flanged at its outer end as shown at 49 to serve in combination with the outer end of the sleeve to hold an inner ring 50 of an anti-friction bearing having the balls 51 and the outer ring 52, of which the latter is carried by the yoke 53 having trunnions 54 for engagement by the fork arms of said pedal lever. Cushioning springs 55 are preferably provided in the fork arms to prevent any rattling between the same and the trunnions. Also the outer wall 56 of the yoke serves as a brake face for contact with the brake disk 57 secured by means of a collar 58 to the driven shaft and having a suitable frictional facing 59. Should there be any tendency of the driven shaft to spin or maintain a high rate of rotation after the clutch has been opened by the operation of the clutch pedal, a continuation of the clutch opening movement of said pedal will bring the brake face 56 of the yoke into contact with the brake disk 57 to retard such rotary movement and thereby facilitate the changing of the gears in the transmission mechanism.

In order that the impulse of the clutch closing spring 43 which is necessarily of great strength in order to maintain a proper relation between the elements of the clutch, may be applied with the maximum efficiency in the operation of the movable element of the clutch as represented by the pressure ring 23 to the end that an effective spring of the minimum power may be employed and therefore to the end that the resistance offered to the operation of the clutch pedal and therefore the effort required to operate the clutch pedal may be minimized, the means for communicating motion from the actuating sleeve 45 to the pressure element 23 of the driving member consists in the construction illustrated of a series of radially disposed levers 60 each of which is pivoted at 61 upon a bracket arm 62 of the carrier 37. Each lever is provided at an intermediate point adjacent to the fulcrum 61 with a shoe 63 pivoted at 64 on the lever and having a flat bearing face for contact with the flat outer face of the pressure ring (but unconnected therewith so as to permit of the rotary or angular movement of the carrier in its adjustment to take up wear or lost motion between the frictional elements of the clutch members) and a link connection 65 between the inner end of the said lever 60 and the sleeve 45. This lever is arranged not only in a radial plane of the clutch but is disposed substantially in a position relative to the axis of the clutch so that the maximum force of the clutch closing spring is utilized, the lever being of the second order with its fulcrum at one extremity and the power applied to the other extremity, with the load at an intermediate point adjacent to the fulcrum. As shown, the radially disposed levers 60 are bifurcated at their outer ends and the arms caused to be formed by the bifurcations are pivotally connected to the carrier ring by the pivots 61. The shoes 63 are on the pivots 64 carried by the arms caused to be formed by the bifurcations, the shoes 63 being relatively close to the crotch of the bifurcation, whereby the crotches will hold the shoes in correct positions to properly engage the pressure ring when the sleeve 45 is moved in a direction toward the wheel-like driven head 29. In similar devices where shoes are used, there are no means for steadying and guiding the shoes when being operated toward their applied positions. However, in the present construction, the crotches of the bifurcations act to prevent excessive pivotal movement of the shoes and thereby direct their engaging faces toward the pressure ring 23. The link 65 obviously compensates for any radial movement of the inner or power end of the lever which movement, however, is slight by reason of the described arrangement of the lever, and this arrangement of the lever is made possible by reason of the radial expansion of the frictional contact elements of the clutch members to the limit of the area defined by the series of bolts used for securing the housing element of the driving member of the clutch to the fly wheel.

The toothed interlocking relation of the frictional elements with the head of the driven clutch member provides for a relative adjustment thereof to insure a proper relation between the parts and a uniformity of movement of the former with relation to the latter under the varying positions of the movable element of the driving member with an assurance of strength in the transmission of motion from the frictional element to the head with the minimum of tendency to cause rattling or objectionable sound due to the engagement of said elements.

In the modified construction shown in Figure 8 the sleeve 45$^a$ is provided with a hardened washer 66 which bears against the properly rounded terminal at the inner end of the operating lever 60$^a$ with the advantage in this arrangement that the terminal of the lever may be located at the side of the driven shaft 28$^a$ and therefore may be made of greater length and afford greater leverage in the application of the power of the clutch spring to the pressure element of the driving member.

Moreover in order to insure an effective release of the driven clutch member a series of retracting springs 67 of the expansion type is arranged in the housing in the intervals between the key bolts 24 and between the fixed and movable elements of the driving member as shown in detail in Figure 4, so that the pressure element may be promptly retracted when the sleeve 45 is actuated to open the clutch.

In Figure 11 is shown a modification of the retracting means for the pressure ring 23. In such modification, the tension springs 67$^a$ are employed, being housed in a manner similar to the springs 67 and being terminally secured to the pressure element 23 and the flange 35 of the housing element 22.

Having described the invention, what is claimed as new and useful is:—

1. A clutch having driving and driven members of which the former includes a pressure element, a spring actuated sleeve mounted upon a driven shaft and operatively connected with said pressure element, a pedal lever for moving the sleeve in opposition to the clutch spring, a bearing thimble fitted in said sleeve, a yoke anti-frictionally mounted upon the thimble and having connection with said pedal lever, and anti-frictional rollers interposed between said thimble and the driven shaft.

2. A clutch having driving and driven members, the former including a pressure element with one of its faces annularly recessed, the latter including a driven shaft, a carrier ring provided with arms protruding into the annular recessed face of the pressure element, a sleeve mounted upon the driven shaft and tensioned to be impelled toward the driven member, radially disposed arms operatively connected to the sleeve with their outer ends bifurcated and extending into the annular recessed face of the pressure element and operatively connected to the arms of the carrier ring, shoes pivotally mounted in the bifurcations to engage with the bottom of the annular recess of the pressure element, means for steadying and guiding the shoes toward and in engagement with the face of the annular recess, the carrier ring being adjustable for regulating the position of the shoes relative to the face of the annular recess, and means for operating the sleeve in opposition to the tensioning impelling means.

In testimony whereof he affixes his signature.

FRANK H. JONES.